US010075655B2

(12) United States Patent
Tao et al.

(10) Patent No.: US 10,075,655 B2
(45) Date of Patent: Sep. 11, 2018

(54) TONAL-ZONE ADAPTIVE TONE MAPPING

(71) Applicant: Samsung Electronics Co., Ltd., Suwon-si (KR)

(72) Inventors: Li Tao, Mountain View, CA (US); Yeong-Taeg Kim, Mountain View, CA (US)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/992,961

(22) Filed: Jan. 11, 2016

(65) Prior Publication Data
US 2016/0360174 A1 Dec. 8, 2016

Related U.S. Application Data

(60) Provisional application No. 62/170,042, filed on Jun. 2, 2015.

(51) Int. Cl.
H04N 9/64 (2006.01)
H04N 5/265 (2006.01)
H04N 9/68 (2006.01)

(52) U.S. Cl.
CPC .............. H04N 5/265 (2013.01); H04N 9/68 (2013.01)

(58) Field of Classification Search
CPC ............ H04N 9/64; H04N 9/68; H04N 9/646; H04N 5/265; H04N 19/46; H04N 19/98; H04N 19/00545
USPC ..... 348/575, 229.1, 362; 382/232, 233, 248; 375/240.08, 240.03
See application file for complete search history.

(56) References Cited

U.S. PATENT DOCUMENTS

| 8,050,512 | B2 | 11/2011 | Daly et al. |
| 8,478,042 | B2 | 7/2013 | Narasimha |
| 8,514,934 | B2* | 8/2013 | Ward ..................... G06T 5/009 375/240.03 |
| 8,934,726 | B2 | 1/2015 | Margerm et al. |
| 8,964,060 | B2 | 2/2015 | Levoy et al. |
| 8,988,552 | B2 | 3/2015 | Atkins |
| 8,995,525 | B2 | 3/2015 | Weigand et al. |
| 9,100,589 | B1 | 8/2015 | Geiss |
| 9,117,134 | B1 | 8/2015 | Geiss et al. |
| 9,288,489 | B2* | 3/2016 | Mertens ................. H04N 19/46 |
| 9,418,311 | B2* | 8/2016 | Bai .......................... G06T 5/007 |
| 2005/0169519 | A1 | 8/2005 | Minakuti et al. |
| 2012/0314944 | A1 | 12/2012 | Ninan et al. |
| 2014/0037206 | A1 | 2/2014 | Newton et al. |
| 2014/0225992 | A1 | 8/2014 | McDowall |

(Continued)

Primary Examiner — Trang U Tran

(57) ABSTRACT

A method for tone mapping includes applying, by at least one processor, at least two tone mapping functions to video data. The at least two tone mapping functions include a first tone mapping function and a second tone mapping function, such as a high tone mapping function and a low tone mapping function that provides an output having more illumination range to low luminance values of the video data than an output that the high tone mapping function provides. The method includes determining a mixing ratio based on an amount of the video data that has luminance values within a predetermined range. The mixing ratio represents a proportion of each of output of the at least two tone mapping functions. The method includes mixing the outputs of the at least two tone mapping functions according to the mixing ratio to generate the tone mapped video.

15 Claims, 10 Drawing Sheets

(56) References Cited

U.S. PATENT DOCUMENTS

| | | |
|---|---|---|
| 2014/0247870 A1 | 9/2014 | Mertens |
| 2015/0007243 A1 | 1/2015 | Kunkel et al. |
| 2015/0245043 A1 | 8/2015 | Greenebaum et al. |
| 2016/0286241 A1* | 9/2016 | Ridge .................... H04N 19/46 |

* cited by examiner

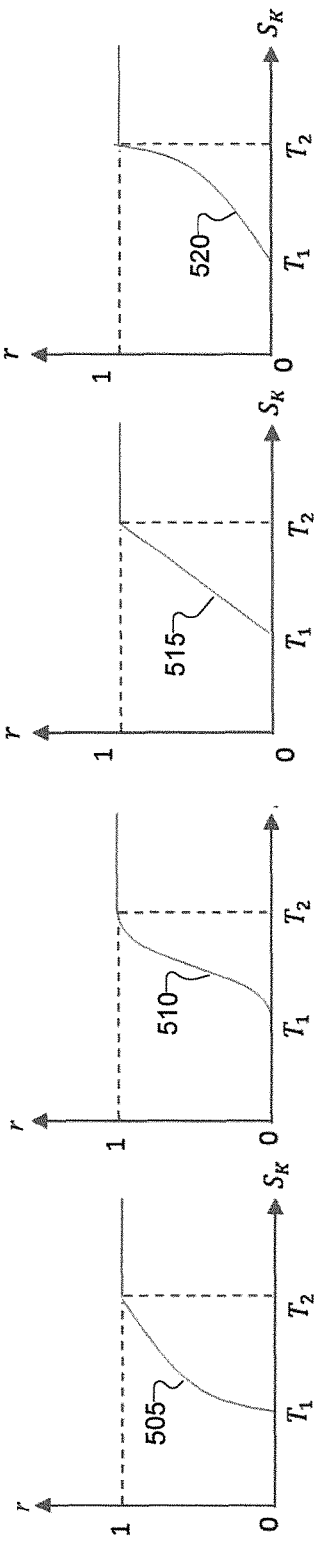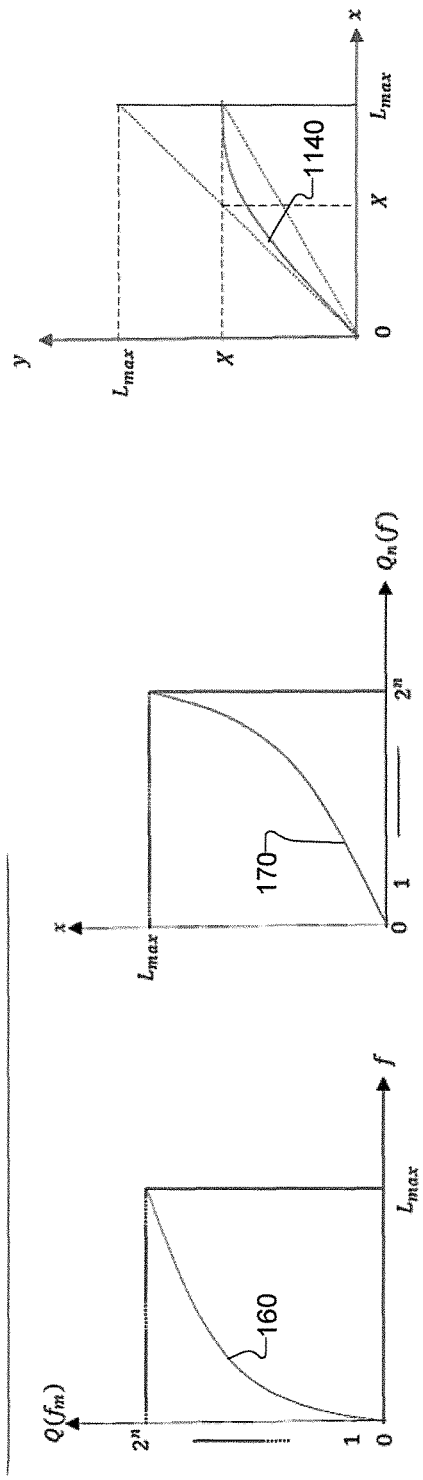

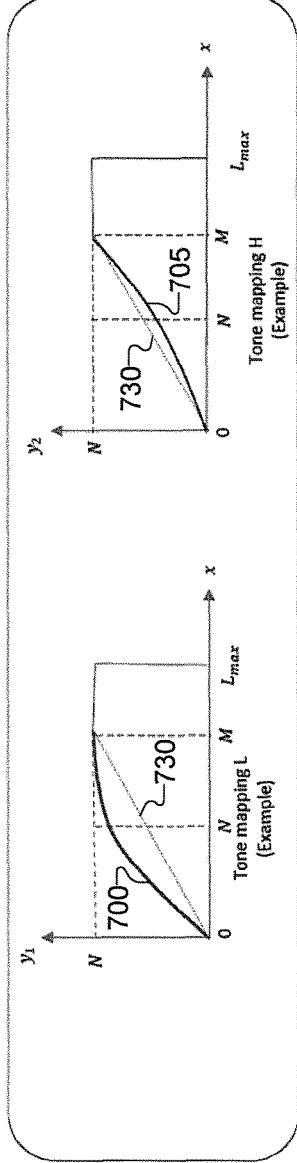
FIGURE 7A
FIGURE 7B
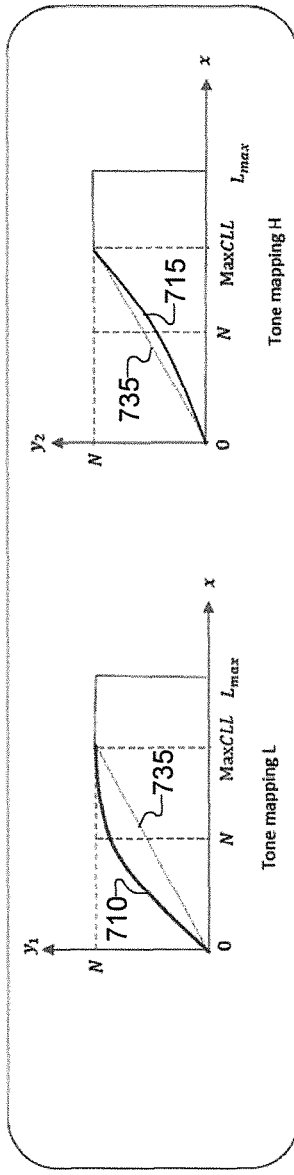
FIGURE 7C
FIGURE 7D
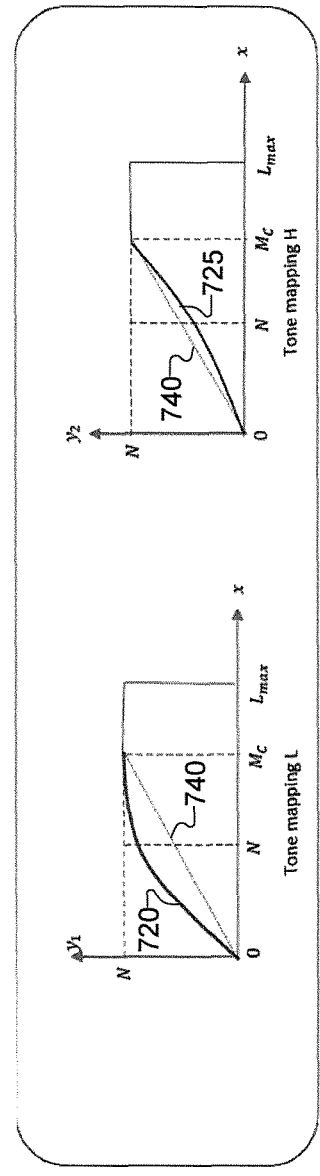
FIGURE 7E
FIGURE 7F

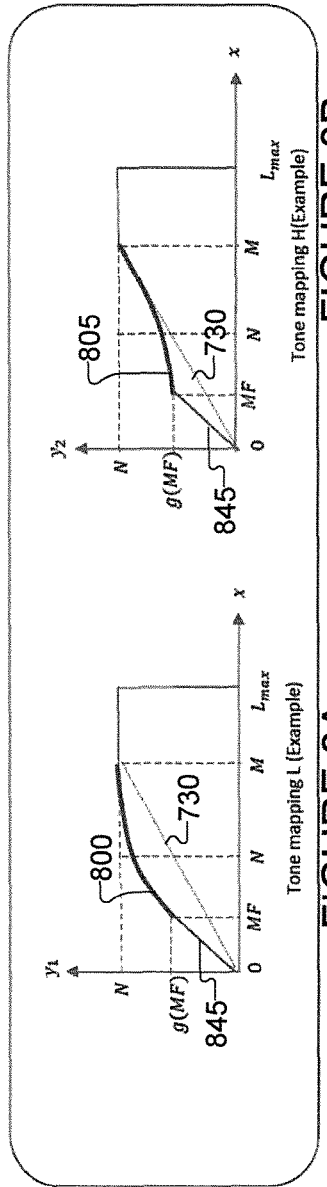
FIGURE 8A
FIGURE 8B
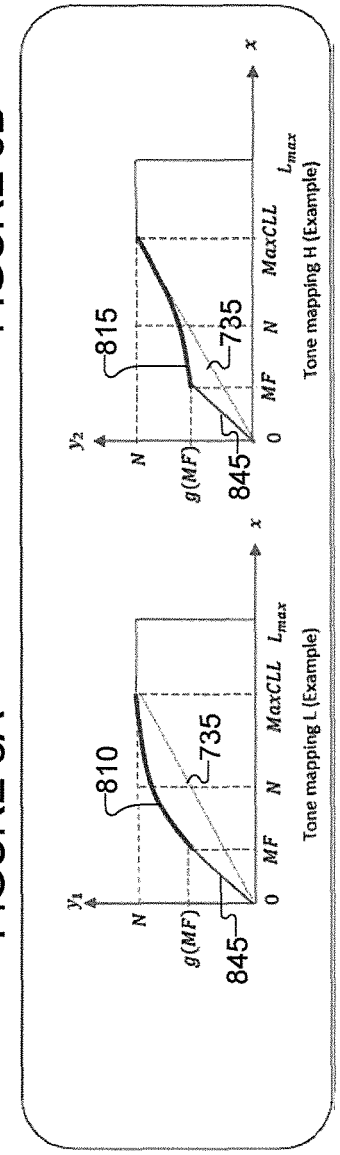
FIGURE 8C
FIGURE 8D
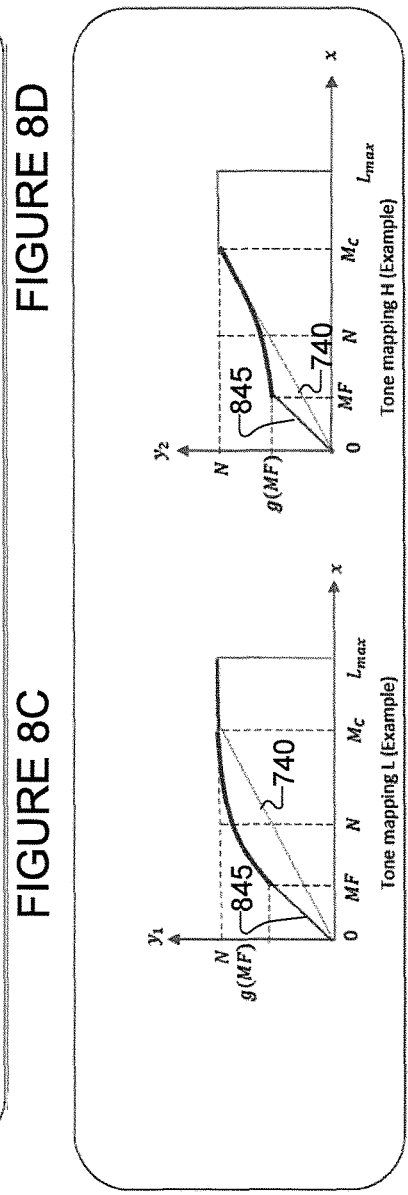
FIGURE 8E
FIGURE 8F

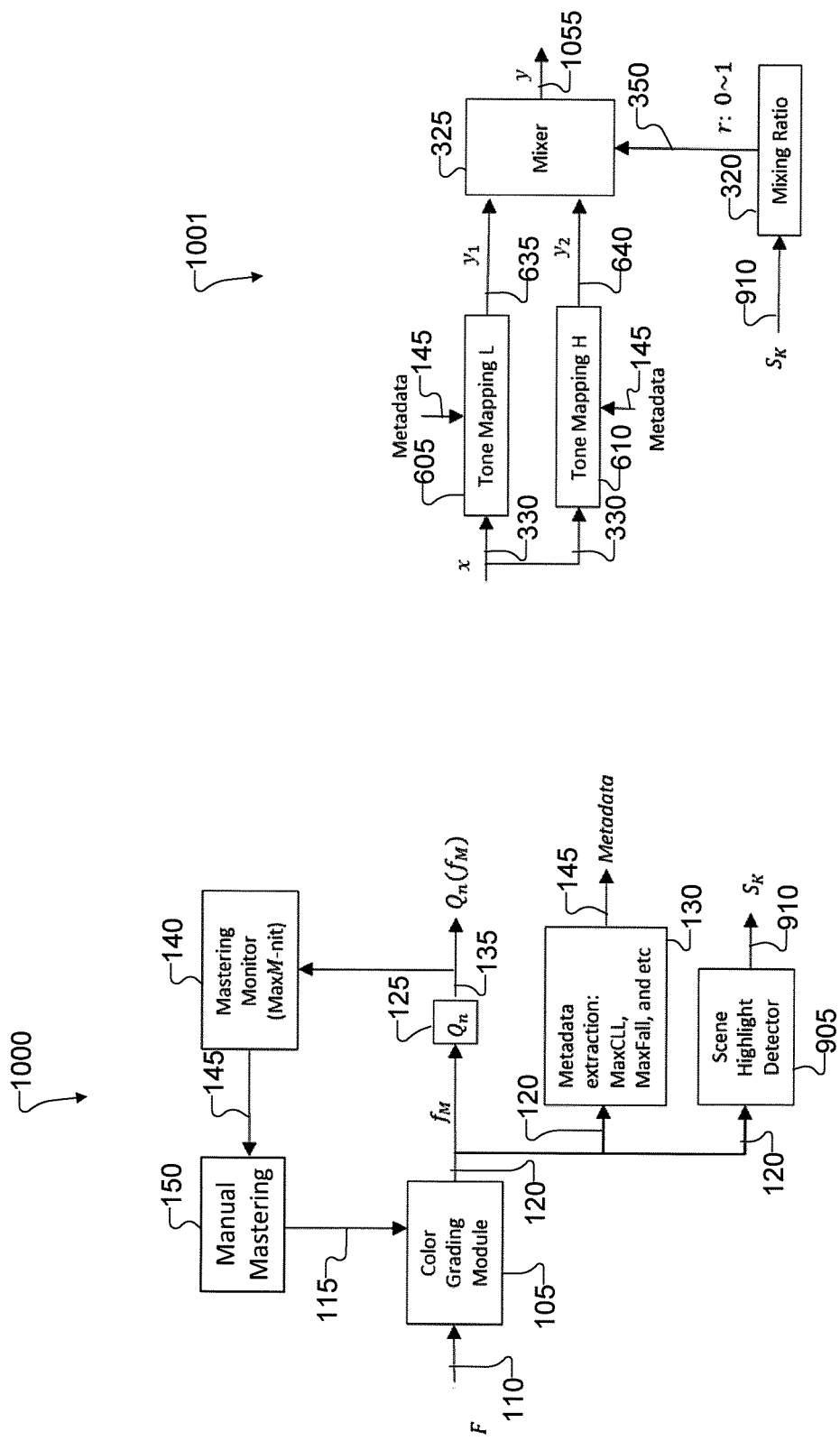

TONAL-ZONE ADAPTIVE TONE MAPPING

CROSS-REFERENCE TO RELATED APPLICATION(S) AND CLAIM OF PRIORITY

This application claims priority under 35 U.S.C. § 119(e) to U.S. Provisional Patent Application No. 62/170,042 filed on Jun. 2, 2015, entitled "High Dynamic Range Tone Mapping." The content of the above-identified patent document is incorporated herein by reference.

The present application is related to U.S. patent application Ser. No. 14/986,548 filed Dec. 31, 2015, entitled "Distribution-Point-Based Adaptive Tone Mapping;" U.S. patent application Ser. No. 14/986,557 filed Dec. 31, 2015, entitled "Adaptive Tone Mapping Based on Local Contrast;" and U.S. patent application Ser. No. 14/986,553 filed Dec. 31, 2015, entitled "Dual Band Adaptive Tone Mapping." The content of each of these patent documents is incorporated herein by reference.

TECHNICAL FIELD

This disclosure relates generally to image processing. More specifically, this disclosure relates to tonal-zone adaptive tone mapping.

BACKGROUND

At a studio, users can produce mastered videos at different mastering monitor peak luminance (brightness) levels targeting home videos, theatres, smartphones, and the like because target devices (i.e., home display device, theatre display device, smartphone, and the like) have different values of M(nit).

As an example, a studio that has already mastered a movie with a mastering monitor having maximum luminance level of M has the mastered file, namely $f_M$, which includes a mastered video. In this example, users may want to have a mastered video at different peak luminance level of N-nit (assume N<M). In such case, users have two options: (i) re-mastering; or (ii) tone mapping.

The re-mastering option uses an N-nit mastering monitor with the original video file, namely F, to create a mastered video. Hence, the option duplicates the workflow of generating the mastered file $f_M$ in order to generate the remastered file $f_N$, which includes a re-mastered video. This re-mastering process can (i) provide a high quality; and/or be costly.

The tone mapping option can be referred to as a down tone mapping method. The tone mapping option uses the already mastered video $f_M$ with algorithms or software to generate a tone mapped video $f_M^N$. This tone mapping process can (i) save time and cost; and/or (ii) produce unsatisfactory results such as saturation of highlighted objects or scenes.

SUMMARY

This disclosure provides tonal-zone adaptive tone mapping.

In a first embodiment, a method for tone mapping includes applying, by at least one processor, at least two tone mapping functions to video data. The at least two tone mapping functions include a first tone mapping function and a second tone mapping function. The method includes determining a mixing ratio based on an amount of the video data that has luminance values within a predetermined range. The mixing ratio represents a proportion of each of output of the at least two tone mapping functions. The method includes mixing the outputs of the at least two tone mapping functions according to the mixing ratio to generate the tone mapped video.

In a second embodiment, an apparatus for tone mapping is provided. The apparatus includes a memory and at least one processor coupled to the memory. The at least one processor is configured to: apply at least two tone mapping functions to video data. The at least two tone mapping functions include a first tone mapping function and a second tone mapping function. The at least one processor is configured to: determine a mixing ratio based on an amount of the video data that has luminance values within a predetermined range. The mixing ratio represents a proportion of each of output of the at least two tone mapping functions. The at least one processor is configured to: mix the outputs of the at least two tone mapping functions according to the mixing ratio to generate the tone mapped video.

In a third embodiment, a non-transitory computer readable medium embodying a computer program that includes computer readable program code that when executed causes at least one processor to apply at least two tone mapping functions to video data. The at least two tone mapping functions include a first tone mapping function and a second tone mapping function. The computer program includes computer readable program code that when executed causes at least one processing device to determine a mixing ratio based on an amount of the video data that has luminance values within a predetermined range. The mixing ratio represents a proportion of each of output of the at least two tone mapping functions. The computer program includes computer readable program code that when executed causes at least one processing device to mix the outputs of the at least two tone mapping functions according to the mixing ratio to generate the tone mapped video.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The teams "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc, an erasable memory device, a volatile memory device, or a non-volatile memory device.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 1B illustrates an example quantization function according to this disclosure;

FIG. 1C illustrates an example dequantization function according to this disclosure;

FIGS. 5A, 5B, 5C, and 5D illustrate graphs of example relationships between a measure ($S_K$) of particular tonal zone of a scene and a mixing ratio according to this disclosure;

FIGS. 7A, 7B, 7C, 7D, 7E, and 7F illustrate examples of tone mappings configured based on metadata which may be utilized for tone mappings in one or more embodiments of this disclosure;

FIGS. 8A, 8B, 8C, 8D, 8E, and 8F illustrate examples of tone mappings configured based on metadata which may be utilized for tone mappings in one or more embodiments of this disclosure;

FIG. 10A illustrates an example mastering system for implementing a tonal-zone adaptive tone mapping method according this disclosure;

FIG. 10B illustrates an example tone mapping block without a tonal-zone area detector that implements a tonal-zone adaptive tone mapping method according this disclosure;

FIG. 11B illustrates a graph of an example relationship between inputs and outputs of the tone mapping block of FIG. 11A;

DETAILED DESCRIPTION

FIGS. 1 through 17, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1A:
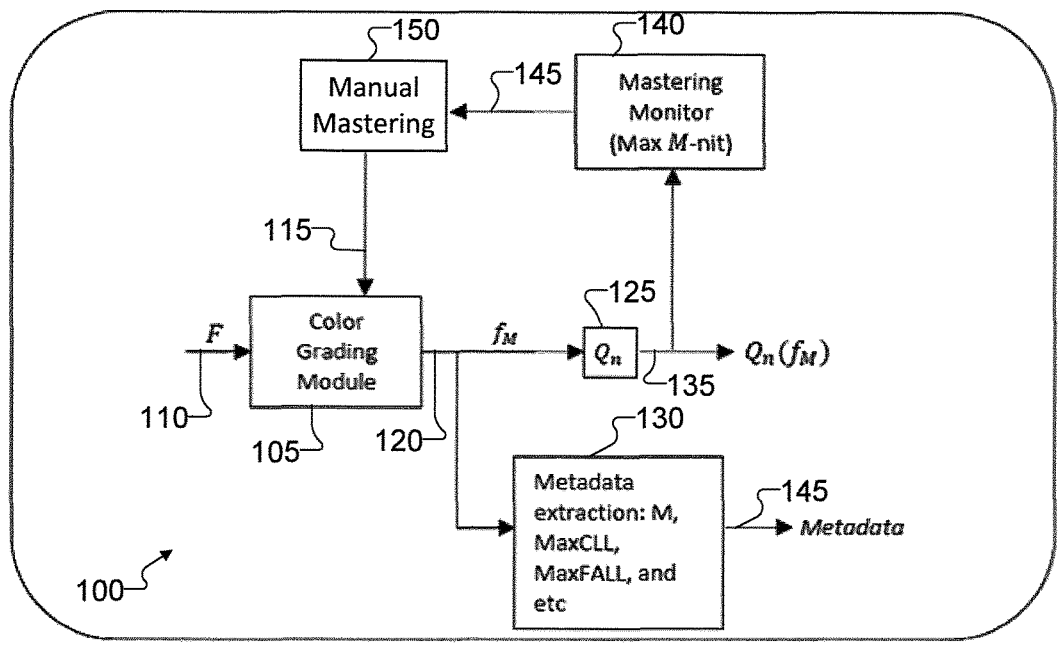
FIG. 1A illustrates an example video mastering system according to this disclosure.

FIG. 1A illustrates an example video mastering system 100 according to this disclosure. For example, the video mastering system 100 can be a movie mastering process associated with a movie studio.

In the video mastering system 100, a color grading module 105 receives input 110 of an original video file F to be mastered or re-mastered. In the case of mastering, the input 110 includes raw data from a camera, which has not been previously mastered. In the case of re-mastering, the input 110 includes a previously mastered video file. The color grading module 105 receives user input 115 representing user color grades of the original video F. That is, a user color grades an input master video by using a color grading module 105. The color grading module 105 generates a mastered video file 120 ($f_M$) from the input 110 by using the user input 115. The mastered video file 120 can be saved in a memory or storage. The color grading module 105 outputs the mastered video file 120, which is input to both a quantizer 125 ($Q_n$) and a metadata extraction module 130.

In the video mastering system 100, the quantizer 125 generates and outputs a quantized mastered video file 135 ($Q_n(f_M)$) by applying a quantization function to the mastered video file 120. The quantized mastered video file 135 can be saved in a memory or storage. The quantized mastered video file 135 is input to a mastering monitor 140. The quantized mastered video file 135 includes an n-bit format.

The metadata extraction module 130 generates and outputs metadata 145 linked to the mastered video file 120. The metadata 145 can be a save as metadata file (SMF) that is saved as a separate file in correspondence with the mastered video files. The metadata extraction module 130 can extract various values from the mastered video file 120, including but not limited to: (i) a maximum luminance level of the mastering monitor 140, namely, M; (ii) a maximum contents luminance level, namely, MaxCLL; and (iii) a maximum frame average luminance level, namely, MaxFALL.

The mastering monitor 140 includes a dequantizer module ($Q_n^{-1}$) that can apply the dequantization function to the quantized mastered video file 135. The mastering monitor 140 has a maximum luminance level of M nits. The mastering monitor 140 provides visual feedback 145 to the user. However, the mastering monitor 140 may have very high contrast in comparison with a consumer display device, such as a consumer-grade television. As a result, the mastered video displayed on the mastering monitor 140 may look different than displayed on a home television set. For example, because the mastering monitor 140 can display brighter images than a home television set, the bright portions of the mastered video displayed on the home television set may clip and, thus, image details may be lost. By displaying the mastered video, the mastering monitor 140 provides visual feedback for continued or iterative adjustment of color tones for the manual mastering process in block 150.

In the manual mastering block 150, the input 110 of the original video file F may be graded using a color grading module 105. Also in the manual mastering block 150, the visual feedback 145, may be graded using a color grading module 105 for continued or iterative adjustment of color tones.

Although FIG. 1A illustrates one example of a video mastering system 100, various changes may be made to FIG. 1A. For example, other embodiments may include more, less, or different components.

FIG. 1B illustrates an example quantization function 160 according to this disclosure. The x-axis represents luminance level of a mastered video file (f). The y-axis represent a number of luminance levels into which the mastered video file is quantized, which can be expressed as a binary code that has an n-bit length. The $L_{max}$ nit value refers to the associated maximum luminance level of the original video file F and the mastered video file 120. The quantizer 125 quantizes a mastered video file (f) into $2^n$ levels with a predetermined quantization curve. Particularly, the quantizer 125 can apply the quantization function 160 to the mastered video file 120 to generate the quantized mastered video file 135 ($Q_n(f_M)$).

FIG. 1C illustrates an example dequantization function 170 according to this disclosure. The dequantization function 170 is an inverse operation of the quantization function 160 of FIG. 1B. The x-axis represent a number of luminance levels of the quantized mastered video file 135 ($Q_n(f_M)$). The y-axis represents the luminance level of the dequantized mastered video file. As an example, the mastering monitor 140 can apply the dequantization function 170.

Figure 2:
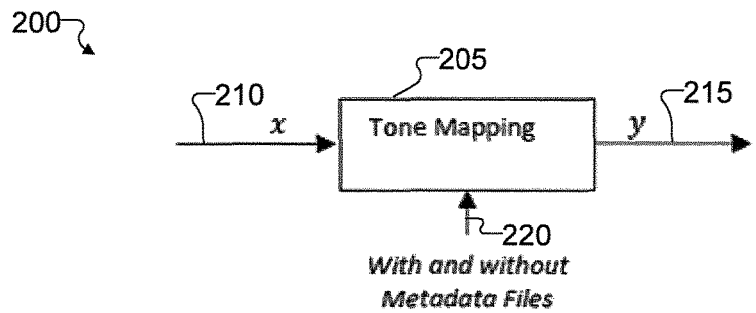
FIG. 2 illustrates an example tone mapping system according to this disclosure.

FIG. 2 illustrates an example tone mapping system 200 according to this disclosure. The tone mapping system 200 enables rendering images on a display device by tonal-zone adaptive tone mapping. The tone mapping system 200 produces a tone mapped video $f_M^N$ from already mastered video $f_M$ with a M-nit mastering monitor, which can provide, among other characteristics, low cost because it is adaptive and automatic, and/or low or no saturation of highlighted objects or scenes.

In the example shown, a tone mapping block 205 receives video data 210 ($x$), which can be with or without metadata files. That is, the tone mapping block 205 can receive metadata files 220 that are linked to the video data 210, though the metadata files 220 can be a separate file from the corresponding video data 210 file. As an example, the video data 210 can include the quantized mastered video file 135, and the metadata files 220 can include the metadata 145 as shown in FIG. 1A. The tone mapping block 205 applies a tone mapping method to the video data 210, and outputs a tone mapped video 215 ($y$).

The tone mapping method applied by the tone mapping block 205 includes one or more applications of tone mapping of images, graphics, and/or video (collectively referred to simply as "video" herein) to facilitate remastering content and/or to facilitate high dynamic range (HDR) display. In certain embodiments the tone mapping block 205 facilitates HDR remastering to different luminance peak levels. In certain embodiments the tone mapping block 205 facilitates tone mapping for a display having a different luminance peak level than that of the mastering monitor. Various embodiments disclosed herein can be used either alone or in combination.

The tone mapping block 205 applies tonal-zone adaptive tone mapping method, which selectively applies a mix of two or more tone mappings to a video file. The amount of mixing of the tone mappings depends at least partly on a measure ($S_K$) of a particular tonal zone of a scene. The term "scene" refers to a set of frames that contain substantially the same background, such as in the case that a camera captures a series of frames with a slight variance due to an affine tremor of body the photographer/videographer. Accordingly, in certain embodiments, the amount of mixing of the tone mappings can depend at least partly on a measure ($R_K$) of a particular tonal zone of a frame. A tonal zone refers to a defined region of the histogram of the scene. Examples of the tonal zones include, but are not limited to, black tones, shadow tones, mid-tones, highlight tones, white tones, and any combination or partial combination thereof. The particular tonal zone can be measured by the area under the histogram measured over the particular tonal zone. Any suitable measure, such as any suitable norm or statistic that characterizes the scene relative to the particular tonal zone can be used. This disclosure provides systems and methods for measuring the area of the highlight tonal zone.

The measure (e.g., $S_K$ or $R_K$) of the tonal zone can be determined in a number of ways. For example, a television (TV) may include a scene tonal-zone area detector that generates the measure (e.g., $S_K$ or $R_K$) in real time by analyzing the scene, as described more particularly below with reference number 315 in FIG. 3. In another example, the measure (e.g., $S_K$ or $R_K$) may be predetermined, for example, provided by the color grading module 105 or measured based on the mastered video output 135, and provided to the TV, as described more particularly below with reference number 905 in FIGS. 9A and 10. For instance, the measure can be determined during the mastering process and saved as metadata, which is provided with the video content during delivery to the TV.

Although FIG. 2 illustrates one example of a tone mapping system 200, various changes may be made to FIG. 2. For example, tone mapping system 200 can be implemented in any suitable visual media device, such as, but not limited to, a television, set box, cable box, peripheral, media player, computer, and the like.

Figure 3:
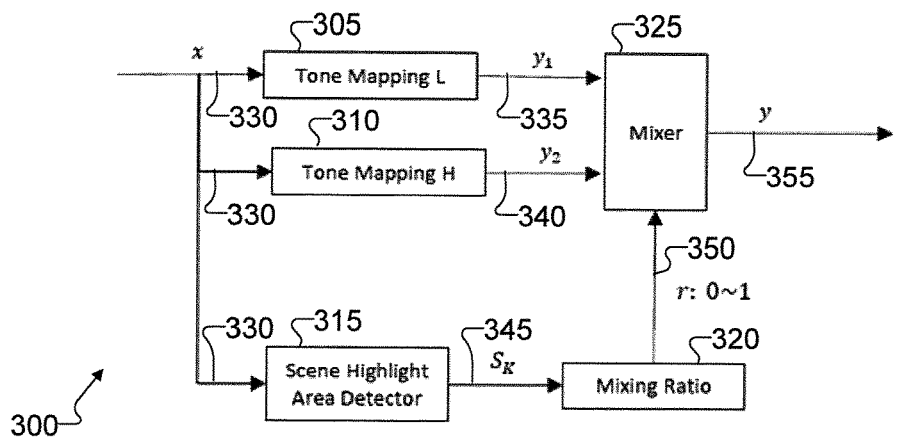
FIG. 3 illustrates an example tone mapping block according to this disclosure.

FIG. 3 illustrates an example tone mapping block 300 according to this disclosure. The tone mapping block 300 could, for example, be used with the tone mapping system 200 of FIG. 2. For instance, the tone mapping block 300 could be the same as or similar to corresponding tone mapping block 205 in FIG. 2. As another example, the tone mapping block 205 could include the components 305-325 shown in FIG. 3.

The tone mapping block 300 applies a mix of two or more tone mappings to a video file. The tone mapping block 300 includes multiple tone mapping function blocks including a first tone mapping function block 305 and a second tone mapping function block 310, a tonal-zone area detector 315, a mixing ratio block 320, and a mixer block 325.

In the example shown, the first and second tone mapping function blocks include a low tone mapping function block 305 and a high tone mapping function block 310. Each tone mapping function block 305 and 310 receives mastered video $f_M$ as input 330 ($x$), applies a tone mapping function to the mastered video $f_M$ of the input 330 to generate and output a candidate tone mapped video. More particularly, the low tone mapping function block 305 applies a low tone mapping function and provides an output 335, namely the candidate low-tone mapped video ($y_1$). The high tone mapping function block 310 applies a high tone mapping function and provides an output 340, namely the candidate high-tone mapped video ($y_2$). Note that the low tone mapping function block 305 provides an output 335 having more illumination range to low luminance values of the mastered video $f_M$ of the input 330 than the output 340 from the high tone mapping function block 310.

In the example shown in FIG. 3, the tonal-zone area detector 315 includes and is referred to as a scene highlight area detector 315. The scene highlight area detector 315 receives mastered video $f_M$ as input 330 ($x$), and generates a measure $S_K$ 345 as output. The measure $S_K$ 345 is a measure of a particular tonal-zone of a scene of the input 330 ($x$). The scene highlight area detector 315 can determine the measure $S_K$ 345 in a number of ways, which are describe below as a "Average Value," a "Ratio Value," a "Max Scene Average Value," and a "Max Scene Ratio."

According to the "Average Value" method, the scene highlight area detector 315 determines the measure $S_K$ 345 of a particular tonal-zone of a scene as the average value of the luminance values of the mastered video $f_M$ of the input 330 within the particular tonal zone (predetermined range). The particular tonal zone can be a range greater than a pre-determined constant K and less than a maximum luminance value (M) of the mastered video. The pre-determined constant K is less than a maximum luminance value (M) of the mastered video. The value of the pre-determined constant (K) can be arbitrary or can depend on characteristics of the target display device. More particularly, the scene highlight area detector 315 determines the measure $S_K$ 345 according to Equations 1 and 2 below. The term $1_{x>K}$ represents a value indicating whether the luminance value of the input ($x$) is greater than the pre-determined constant K; and the term $x \in \text{scene}$ represents that $x$ is a member of a set that is the scene.

$$S_K = \frac{\Sigma_{x \in scene} x \cdot 1_{x>K}}{\Sigma_{x \in scene} 1_{x>K}} \quad (1)$$

$$\text{where } 1_{x>K} = \begin{cases} 1, \text{ if } x > K \\ 0, \text{ else} \end{cases} \quad (2)$$

According to the "Ratio Value" method, the scene highlight area detector 315 determines the measure $S_K$ 345 as the ratio of the number of luminance values of the mastered video $f_M$ of the input 330 that within a particular tonal-zone compared to the number of luminance values of the mastered video $f_M$ of the input 330. For ease of explanation, the particular tonal zone (namely, x>K, greater than the pre-determined constant K) will be applied as an example for describing the "Ratio Value," a "Max Scene Average Value," and a "Max Scene Ratio" methods. More particularly, the scene highlight area detector 315 determines the measure $S_K$ 345 according to Equation 3 below.

$$S_K = \frac{\Sigma_{x \in scene} 1_{x>K}}{\Sigma_{scene} 1} \quad (3)$$

According to the "Max Scene Average Value" method, scene highlight area detector 315 determines the measure $S_K$ 345 as the maximum of the average values of the luminance values within a particular tonal zone of the frames in a same input scene of the mastered video $f_M$ of the input 330. In making this determination, the scene highlight area detector 315 identifies a set of frames in a same input scene, and each frame in the input scene has an index i. For example, if the input scene includes four frames, the then set is {frame$_1$, frame$_2$, frame$_{i=4}$}. For each indexed frame (frame$_i$), scene highlight area detector 315 identifies and calculates an average value of the luminance values within the particular tonal zone. The scene highlight area detector 315 selects the maximum from among the average values corresponding to each indexed frame (frame$_i$). Equations 4 and 5 express the "Max Scene Average Value" method of determining the measure $S_K$ 345.

$$S_K = \max\left(\frac{\Sigma_{x \in frame_i} x \cdot 1_{x>K}}{\Sigma_{x \in frame_i} 1_{x>K}}, i = 1, 2, \ldots\right) \quad (4)$$

$$\text{where } 1_{x>K} = \begin{cases} 1, \text{ if } x > K \\ 0, \text{ else} \end{cases} \quad (5)$$

As a particular non-limiting example, if a particular indexed frame frame$_{i=3}$ includes five samples that have luminance values {1, 2, 3, 4, 5}, and if the pre-determined constant K=3, then the indexed frame includes two samples that have luminance values {4, 5} within the particular tonal-zone (x>K), and the average value corresponding to frame$_{i=3}$ is 4.5 based on (4+5)/2.

According to the "Max Scene Ratio" method, the scene highlight area detector 315 determines the measure $S_K$ 345 of a particular tonal-zone of a scene as the maximum of the ratios of the number of the frames a same input scene of the mastered video $f_M$ of the input 330 within the particular tonal zone. The scene highlight area detector 315 determines the measure $S_K$ 345 according to Equation 6 below.

$$S_K = \max\left(\frac{\Sigma_{x \in frame_i} 1_{x>K}}{\Sigma_{x \in frame_i} 1}, i = 1, 2, \ldots\right) \quad (6)$$

The mixing ratio block 320 receives the measure $S_K$ as input and produces the mixing ratio 350 ($r$) based on the measure $S_K$ 345. The mixing ratio 350 ($r$) represents a proportion of each of output 335 and 340 of the multiple tone mapping function blocks 305 and 310. The mixing ratio ($r$) can determine the amount of influence of the tone mappings. The mixing ratio 350 can be equal to zero ($r=1$), indicating that the tone mapped video 355 ($f_M^N$) is equal to the candidate low-tone mapped video ($y_1$) of the output 335. The mixing ratio 350 can be equal to zero ($r=0$), indicating that the tone mapped video 355 ($f_M^N$) is equal to the candidate low-tone mapped video ($y_1$) of the output 335. The mixing ratio 350 can be equal to one ($r=1$), indicating that the tone mapped video 355 ($f_M^N$) is equal to the candidate high-tone mapped video ($y_2$) of the output 340. The mixing ratio 350 can be a value between zero and one, indicating that the tone mapped video 355 ($f_M^N$) includes both: (i) some of the candidate low-tone mapped video ($y_1$) of the output 335; and (ii) some of the candidate high-tone mapped video ($y_2$) of the output 340. For example, the mixing ratio block 320 can receive each of the outputs $y_1, \ldots, y_n$ from the multiple tone mapping blocks can produce and determine a weighted combination (e.g., convex combination) of the weighted outputs (e.g., tone mapped video $y=c_1y_1+c_2y_2+ \ldots +c_ny_n$ where the weights $c_1, c_2, \ldots, c_n$ sum to unity). In this way, video content having a large measure of highlight tones, for example, will cause the tone mapping block 300 to apply a mix of tone mappings that emphasizes the high tone mappings that provide more range to the highlight tones and, thereby, prevent clipping of the brighter portions of the scene. In converse, video content having a low measure of highlight tones, will cause the tone mapping block 300 to apply a mix of tone mappings emphasizes the low tone mappings provide more range to the shadows tones and, thereby, open up the details of the darker portions of the scene.

The mixer block 325 receives the mixing ratio ($r$) 350 and the candidate tone mapped videos $y_1$ and $y_2$ from the multiple tone mapping function blocks 605 and 610 as inputs. The mixer block 325 mixes the outputs 635 and 640 ($y_1$ and $y_2$) according to the mixing ratio 350 to generate the tone mapped video 655 ($f_M^N$) as output ($y$). The mixer block 325 applies Equation 7 to generate the tone mapped video 655.

$$y=(1-r)y_1+ry_2 \quad (7)$$

Although FIG. 3 illustrates one example tone mapping block 300, various changes may be made to FIG. 3. For example, the mixer block 325 can be configured to generate the tone mapped video 355 by selecting one candidate tone mapped video from among the outputs of the multiple tone mapping function blocks, rather than mixing the candidate tone mapped videos. In the example shown in FIG. 3, the mixer block 325 would select one the two outputs 335 and 340 to be outputted as the tone mapped video 355 ($f_M^N$).

Figure 4A:
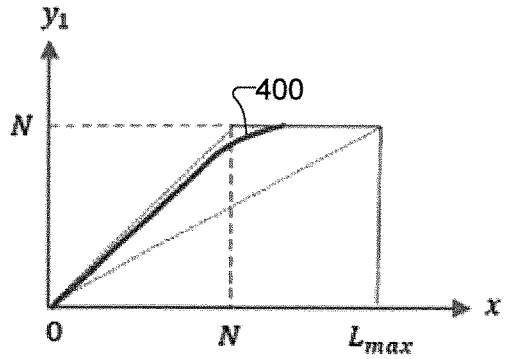
FIGS. 4A and 4B illustrate examples of tone mappings which may be utilized for tone mappings in one or more embodiments of this disclosure.
Figure 4B:
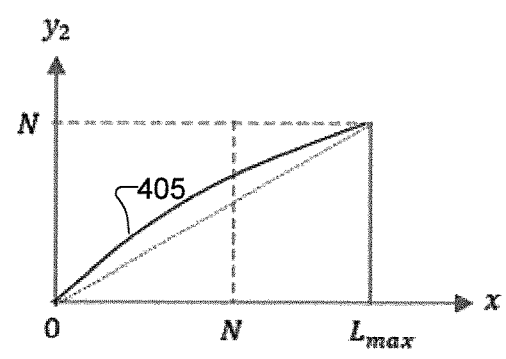

FIGS. 4A and 4B illustrate example tone mappings 400 and 405 that may be utilized in the low and high tone mapping function blocks 305 and 310 of FIG. 3. The examples of tone mappings 400 and 405 shown in FIGS. 4A and 4B are for illustration only. Other embodiments could be used without departing from the scope of this disclosure.

In FIG. 4A, the low tone mapping 400 shows a relationship between luminance values for the input video x having a maximum luminance value of $L_{max}$ and luminance values for the output video $y_1$ that is intended for display on a target display having a maximum luminance value of N. As shown for this low tone mapping 400, certain high luminance values in the input video x are clipped or otherwise represented as the same luminance values in the output video $y_1$. Note that this clipping provides a saturation for high tones or high luminance values the input video x. For example, certain high luminance values in the input video x that are greater than or equal to the maximum luminance value of N of the target display are represented in the output video $y_1$ as having the maximum luminance value of N of the target display.

In FIG. 4B, the high tone mapping 405 shows a relationship between luminance values for the input video x having a maximum luminance value of $L_{max}$ and luminance values for the output video $y_2$ that is intended for display on a target display having a maximum luminance value of N. As depicted for this high tone mapping 405, none of the luminance values in the input video x are clipped. The luminance values in the input video x are scaled or otherwise mapped to a luminance value in the output video $y_2$. Note that this absence of clipping provides an absence of saturation for high tones or high luminance values the input video x, which results in more contrasting details or an overall darker visual depiction.

A linear mapping function, shown as a dashed line, scales the luminance values in the input video x that are between 0 and $L_{max}$ to luminance values in the output video ($y_1$ or $y_2$) that are in the range between 0 and N. This linear mapping function provides a basis for comparing the effects of various tone mapping functions. In a comparison of the tone mappings 400 and 405 shown in FIGS. 4A and 4B for an input luminance value that equals the maximum luminance value of N, the low tone mapping 400 maps the output video ($y_1$) to a luminance value that is much higher above the linear mapping function than the high tone mapping 405 maps the output ($y_2$).

One or more example embodiments of this disclosure recognize that a low tone mapping may expand shadow tones by compressing highlight tones, and a high tone mapping may provide more headroom for highlight tones by compressing lower tones (e.g., mid-tones and shadow tones). By mixing, an intermediate tone mapping can be achieved dynamically. The amount of mixing of the tone mappings depends at least partly on a measure of a particular tonal zone of a scene.

FIGS. 5A, 5B, 5C, and 5D illustrate graphs of example relationships between a measure (e.g., $S_K$ or $R_K$) of particular tonal zone of a scene and a mixing ratio according to this disclosure. The examples of relationships shown in FIGS. 5A, 5B, 5C, and 5D are for illustration only. Other embodiments could be used without departing from the scope of this disclosure.

The mixing ratio block 320 may use the graphs of FIGS. 5A, 5B, 5C, and 5D to determine the relationship between input and the output of mixing ratio block 320, namely, the measure $S_K$ 345 and mixing ratio 350. In FIGS. 5A, 5B, 5C, and 5D, the symbols $T_1$ and $T_2$, in represent predetermined contrast ratio of two different tone mapping results; and the mixing ratio r has a zero value when $S_K<T_1$ and has a one value when $S_K<T_2$. Where the measure (e.g., $S_K$ or $R_K$) is between the predetermined contrast ratios $T_1<S_K<T_2$, FIG. 5A shows a logarithmic relationship 505, FIG. 5B shows an exponential relationship 510, FIG. 5C shows an linear relationship 515, and FIG. 5D shows an exponential relationship 520.

Figure 6:
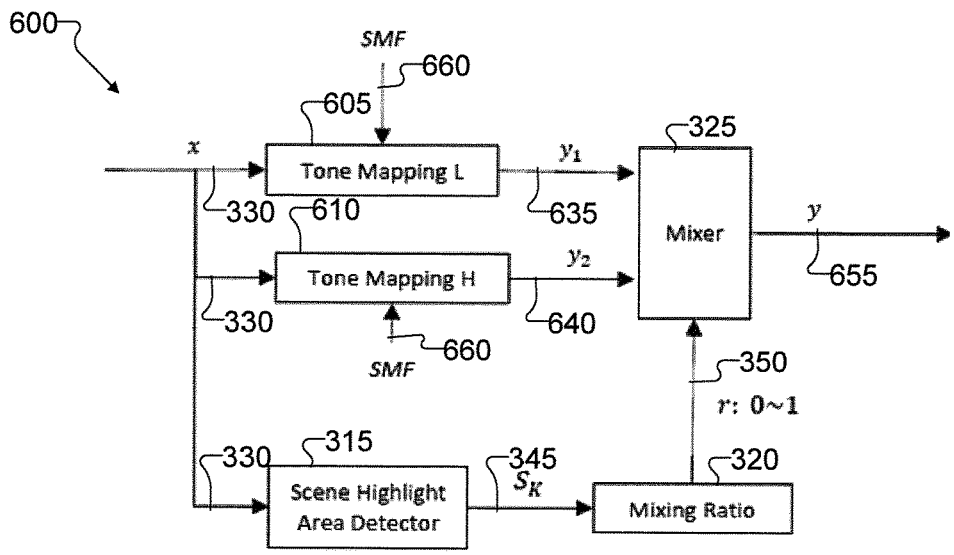
FIG. 6 illustrates an example tone mapping block according to this disclosure.

FIG. 6 illustrates an example tone mapping block 600 according to this disclosure. The tone mapping block 600 could, for example, be used with the tone mapping system 200 of FIG. 2. For instance, the tone mapping block 600 could be the same as or similar to corresponding tone mapping block 205 in FIG. 2. As another example, the tone mapping block 205 could include the components 305-325 shown in FIG. 3.

Note that while multiple tone mapping blocks 300 and 600 are described herein, features of one tone mapping block could be used in the other tone mapping block. For instance, the tone mapping block 600 could receive the mastered video $f_M$ as input 330 ($x$) and could include the scene highlight area detector 315 that outputs the measure $S_K$ 345, the mixing ratio block 320 that outputs the mixing ratio 350, and the mixer 325 of the tone mapping block 300. For simplicity of explanation, descriptions of the features 315, 320, 325, 330, and 345 will not be duplicated with reference to FIG. 6.

The tone mapping block 600 applies a mix of two or more tone mappings to a video file, as described in reference to FIG. 3. The tone mapping block 600 includes multiple tone mapping function blocks including a first tone mapping function block 605 and a second tone mapping function block 610. The first and second tone mapping function blocks include a low tone mapping function block 605 and a high tone mapping function block 610. Each tone mapping function block 605 and 610 receives mastered video $f_M$ as input 330 ($x$). Additionally, each tone mapping function block 605 and 610 receives metadata 660 as input. Each tone mapping function block 605 and 610 can configure, such as by adjusting, its tone mapping function based on the received metadata 660, as described more particularly below with reference to FIGS. 7 and 8. Each tone mapping function block 605 and 610 generates a candidate tone mapped video as outputs 635 and 640 by applying the tone mapping function that has been configured based on the received metadata 660 to the mastered video $f_M$ of the input 330.

The mixer block 325 receives the mixing ratio (r) 350 and the candidate tone mapped videos $y_1$ and $y_2$ from the multiple tone mapping function blocks 605 and 610 as inputs. The mixer block 325 mixes the outputs 635 and 640 ($y_1$ and $y_2$) according to the mixing ratio 350 to generate the tone mapped video 655 ($f_M^N$) as output (y). The mixer block 325 applies Equation 7 to generate the tone mapped video 655.

$$y=(1-r)y_1+ry_2 \qquad (7)$$

Although FIG. 6 illustrates one example tone mapping block 600, various changes may be made to FIG. 6. For example, the mixer block 325 can be configured to generate the tone mapped video 655 by selecting one candidate tone mapped video from among the outputs of the multiple tone mapping function blocks, rather than mixing the candidate tone mapped videos. In the example shown in FIG. 3, the mixer block 325 would select one the two outputs 635 and 640 to be outputted as the tone mapped video 655 ($f_M^N$).

FIGS. 7A, 7B, 7C, 7D, 7E, and 7F and FIGS. 8A, 8B, 8C, 8D, 8E, and 8F illustrate examples of tone mappings configured based on metadata which may be in the low and high tone mapping function blocks 605 and 610 of FIG. 6. The examples of tone mappings 700, 705, 710, 715, 720, and 725 shown in FIGS. 7A, 7B, 7C, 7D, 7E, and 7F, as well as the examples of tone mappings 800, 805, 810, 815, 820, and 825 shown in FIGS. 8A, 8B, 8C, 8D, 8E, and 8F are for illustration only. Other embodiments could be used without departing from the scope of this disclosure.

In each of FIGS. 7A, 7C, 7E, 8A, 8C, and 8E the low tone mapping shows a relationship between luminance values for the input video x having a maximum luminance value of $L_{max}$ and luminance values for the output video $y_1$ that is intended for display on a target display having a maximum luminance value of N. In each of FIGS. 7B, 7D, 7F, 8B, 8D, and 8F, the high tone mapping shows a relationship between luminance values for the input video x having a maximum luminance value of $L_{max}$ and luminance values for the output video $y_2$ that is intended for display on a target display having a maximum luminance value of N.

The low and high tone mapping function blocks 605 and 610 can configure the tone mappings based on various metadata, and each metadata affects the low and high tone mappings differently. For example, FIGS. 7A and 7B illustrate examples of tone mappings 700 and 705 configured based on the M metadata, namely, the maximum luminance level of the mastering monitor. A linear mapping function 730 scales the luminance values in the input video x that are between 0 and M to luminance values in the output video ($y_1$ or $y_2$) that are in the range between 0 and N. In a comparison of the tone mappings 700 and 705 shown in FIGS. 7A and 7B for an input luminance value that equals the maximum luminance value of N, the low tone mapping 700 maps the output video ($y_1$) to a luminance value that is much higher above the linear mapping function than the high tone mapping 705 maps the output ($y_2$), which is mapped to luminance value that is below the linear mapping function.

FIGS. 7C and 7D illustrate examples of tone mappings 710 and 715 configured based on the MaxCLL metadata, namely, maximum contents luminance level. A linear mapping function 735 scales the luminance values in the input video x that are between 0 and MaxCLL to luminance values in the output video ($y_1$ or $y_2$) that are in the range between 0 and N. In a comparison of the tone mappings 710 and 715 shown in FIGS. 7C and 7D for an input luminance value that equals the maximum luminance value of N, the low tone mapping 710 maps the output video ($y_1$) to a luminance value that is much higher above the linear mapping function than the high tone mapping 715 maps the output ($y_2$), which is mapped to luminance value that is below the linear mapping function.

FIGS. 7E and 7F illustrate examples of tone mappings 720 and 725 configured based on a combination of metadata $M_C$, such as, a minimum value selected from the maximum contents luminance level (MaxCLL) and the maximum luminance level of the mastering monitor (M). A linear mapping function 740 scales the luminance values in the input video x that are between 0 and MaxCLL to luminance values in the output video ($y_1$ or $y_2$) that are in the range between 0 and N. In a comparison of the tone mappings 720 and 725 shown in FIGS. 7E and 7F for an input luminance value that equals the maximum luminance value of N, the low tone mapping 720 maps the output video ($y_1$) to a luminance value that is much higher above the linear mapping function than the high tone mapping 725 maps the output ($y_2$), which is mapped to luminance value that is below the linear mapping function.

FIGS. 8A, 8B, 8C, 8D, 8E, and 8F illustrate examples of tone mappings configured based on a maximum frame average luminance level (MaxFALL or MF) together with another metadata according to this disclosure. In FIGS. 8A, 8B, 8C, 8D, 8E, and 8F, the tone mappings 800, 805, 810, 815, 820, and 825 include a first tone mapping portion 845. The first tone mapping portion 845 shows that the luminance values for the input video x that are within the range of 0 to MaxFALL are mapped to luminance values for the output video ($y_1$ and $y_2$) according to a pre-determined function of the MaxFALL, namely, g(MF). The remainder of the tone mappings 800, 805, 810, 815, 820, and 825, outside the first tone mapping portion, shows that the luminance values for the input video x that are within the range of MaxFALL to M are mapped to luminance values in the output video ($y_1$ or $y_2$) according to the other corresponding metadata (e.g., M, MaxCLL, and $M_C$) that serves as the basis for the configuration of the tone mapping. Also note at the linear mapping functions 730, 734, and 740 of FIGS. 7A, 7B, 7C, 7D, 7E, and 7F apply in a similar manner in FIGS. 8A, 8B, 8C, 8D, 8E, and 8F.

FIGS. 8A and 8B show that the remainder of tone mappings 800 and 805 is configured based on the M metadata. In a comparison of the tone mappings 800 and 805 for an input luminance value that equals the maximum luminance value of N, the low tone mapping 800 maps the output video ($y_1$) to a luminance value that is much higher above the linear mapping function than the high tone mapping 805 maps the output ($y_2$), which is mapped to luminance value that is slightly higher than the linear mapping function 730.

FIGS. 8C and 8D show that the remainder of tone mappings 810 and 815 is configured based on the MaxCLL metadata. In a comparison of the tone mappings 810 and 815 for an input luminance value that equals the maximum luminance value of N, similar observations can be made with reference to the linear mapping function 735 as describe above with reference to the comparison of the tone mappings 800 and 805.

FIGS. 8E and 8F show that the remainder of tone mappings 820 and 825 is configured based on the $M_C$ metadata. In a comparison of the tone mappings 820 and 825 for an input luminance value that equals the maximum luminance value of N, similar observations can be made with reference to the linear mapping function 740 as describe above with reference to the comparison of the tone mappings 800 and 805.

Figure 9A:
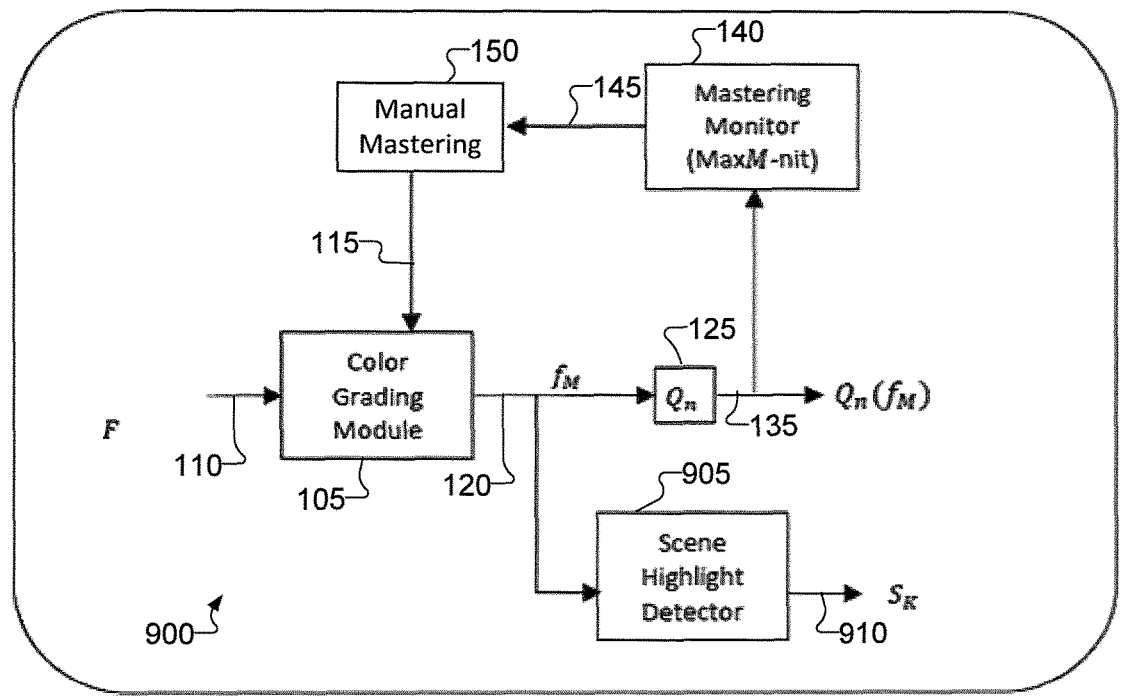
FIG. 9A illustrates an example mastering process according to this disclosure.

FIG. 9A illustrates an example mastering system 900 according to this disclosure. The mastering system 900 could provide inputs to the tone mapping system 200 of FIG. 2.

Note that while multiple mastering processes 100 and 900 are described herein, features of one mastering process could be used in the other mastering process. For instance, the mastering system 900 could receive input 110 of an original video file F to be mastered or re-mastered and could include features 105, 110, 120, 125, 135, 140, 145, and 150 of the mastering system 100. For simplicity of explanation, descriptions of these features will not be duplicated with reference to FIG. 9A.

The mastering system 900 includes a tonal-zone area detector, such as a scene highlight area detector 905. The scene highlight area detector 905 can operate in the same or similar manner as the scene highlight area detector 315 in FIG. 3. More particularly, the scene highlight area detector 905 receives the mastered video file 120 ($f_M$) as input, and generates a measure $S_K$ 910 of a particular tonal-zone of a scene of the mastered video file 120 as output. The measure $S_K$ 910 can be the same as or similar to the measure $S_K$ 345. By including the scene highlight area detector 905, the mastering system 900 can provide the measure $S_K$ 910 to a tone mapping system, such as tone mapping system 200 or the tone mapping system 901 described below. In certain embodiments, the measure $S_K$ 910 can be linked to the mastered video file ($f_M$) in the form of metadata and output from the mastering system 900.

Although FIG. 9A illustrates one example mastering system 900, various changes may be made to FIG. 9A. For example, other embodiments may include more, less, or different components.

Figure 9B:
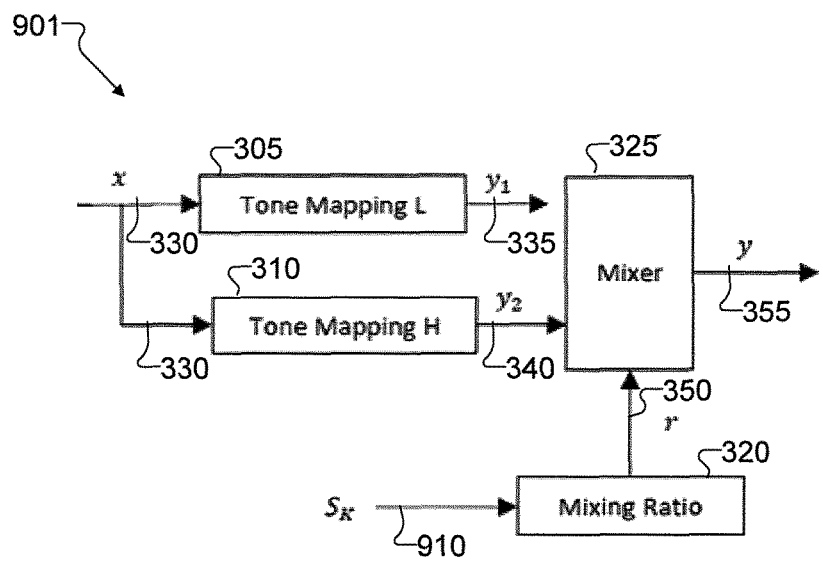
FIG. 9B illustrates an example tone mapping block without a tonal-zone area detector according to this disclosure.

FIG. 9B illustrates an example tone mapping block 901 without a tonal-zone area detector according to this disclosure. The tone mapping block 901 could, for example, be used with the tone mapping system 200 of FIG. 2. For instance, the tone mapping block 901 could be the same as or similar to corresponding tone mapping block 205 in FIG. 2. As another example, the tone mapping block 901 could operate in a similar manner as the tone mapping block 300 in FIG. 3 and could include the components 305, 310, 320, and 325 shown in FIG. 3. The tone mapping block 901 receives mastered video $f_M$ as input 330 (x) to the multiple tone mapping blocks 305 and 310, and receives the measure $S_K$ 910 as input to the mixing ratio block 320.

Although FIG. 9B illustrates one example tone mapping block 901, various changes may be made to FIG. 9B. For example, other embodiments may include more, less, or different components.

FIG. 10A illustrates an example mastering system 1000 for implementing a tonal-zone adaptive tone mapping method according this disclosure. The mastering system 1000 provides inputs to the tone mapping block 1001 without a tonal-zone area detector of FIG. 10B.

Note that while multiple mastering processes 900 and 1000 are described herein, features of one mastering process could be used in the other mastering process. For instance, the mastering system 1000 could receive input 110 of an original video file F to be mastered or re-mastered and could include the mastering processes 900 and all of its components. Additionally, the mastering system 1000 includes the metadata extraction module 130 of FIG. 1. For simplicity of explanation, descriptions of features common between FIG. 10A and previous figures will not be duplicated with reference to FIG. 10A. The mastering system 1000 receives input 110 of an original video file F to be mastered or re-mastered, generates a mastered video file, and outputs video data including the mastered video file ($f_M$), the metadata 145 file linked to the mastered video file ($f_M$), and the measure $S_K$ 910.

FIG. 10B illustrates an example tone mapping block 1001 without a tonal-zone area detector that implements a tonal-zone adaptive tone mapping method according this disclosure. For simplicity of explanation, descriptions of features common between FIG. 10B and previous figures will not be duplicated with reference to FIG. 10B.

The tone mapping block 1001 could, for example, be used with the tone mapping system 200 of FIG. 2. For instance, the tone mapping block 1001 could be the same as or similar to corresponding tone mapping block 205 in FIG. 2. As another example, the tone mapping block 205 could include the components 605, 610, 320, and 325 of the tone mapping block 1001 shown in FIG. 10B.

The tone mapping block 1001 receives mastered video $f_M$ as input 330 (x) and the metadata 145 as input to the multiple tone mapping function blocks 605 and 610. The input 330 can be the same as the mastered video file 120. In tone mapping block 1001 receives the measure $S_K$ 910 as input to the mixing ratio block 320. The mixer block 325 mixes the outputs 635 and 640 ($y_1$ and $y_2$) according to the mixing ratio 350 to generate the tone mapped video 1055 ($f_M^N$) as output (y). The mixer block 325 applies Equation 7 to generate the tone mapped video 1055.

$$y = (1-r)y_1 + ry_2 \qquad (7)$$

Although FIG. 10 illustrates one example implementation of a tonal-zone adaptive tone mapping method, various changes may be made to FIG. 10. For example, other embodiments may include more, less, or different components.

Figure 11A:
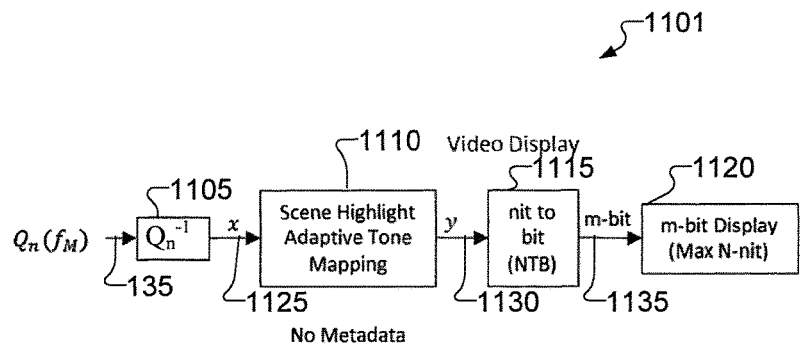
FIG. 11A illustrates an example video display with no metadata according to this disclosure.

FIG. 11A illustrates an example video display 1101 with no metadata according to this disclosure. In FIG. 11A, the mastering system 100 of FIG. 1 provides input, namely, a quantized mastered video file 135 ($Q_n(f_M)$), to the video display 1101, which renders images by applying tonal-zone adaptive tone mapping. Although the metadata extraction module 130 of the mastering system 100 outputs the metadata 145, the tone mapping block 1110 receives no metadata. For simplicity of explanation, descriptions of features common between FIG. 11A and previous figures will not be duplicated with reference to FIG. 11A.

The video display 1101 includes a dequantizer module 1105 ($Q_n^{-1}$), a scene highlight adaptive tone mapping block 1110, a nit-to-bit (NTB) converter module 1115, and an m-bit display 1120. The tone mapping block 1110 can include the tone mapping block 300 of FIG. 3. As an example, the tone mapping block 1110 can apply the tone mapping function 1140 discussed more particularly below with reference to FIG. 11B. The dequantizer module 1105 that can generate a mastered video file 1125 ($x$) by applying a dequantization function, such as the dequantization function 170 of FIG. 1C, to the quantized mastered video file 135. The mastered video file 1125 ($x$) can be the same as or similar to the mastered video $f_M$ if input 330 ($x$) of FIG. 3.

The operation of the dequantizer module 1105 can be expressed or modeled approximately by Equation 8, wherein $L_{max}$ is a floating point, the dequantizer module 1105 outputs a value x that is equal to the mastered video file 120 ($f_M$) generated by the color grading module 105 of the mastering process.

$$x = Q_n^{-1}(Q_n(f)) = f \quad (8)$$

In some cases, wherein $L_{max}$ is an integer, such as a function of n, there can be a quantization error that indicates a variance amount by which the dequantizer module 1105 outputs a value x that is slightly varied from to the mastered video file 120 ($f_M$) generated by the color grading module 105 of the mastering process. The quantization error can be expressed by Equation 9.

$$\text{Quantization error} = |x - f| \quad (9)$$

The NTB 1115 receives the tone mapped video 1130 from the tone mapping block 1110 in a nits format. The NTB 1115 converts the tone mapped video 1130 to an m-bit format 1135 by applying a nit-to-bit conversion function to the video data of the tone mapped video 1130.

The m-bit display 1120 has a maximum luminance level of N nits (shown as Max N-nit). For example, the m-bit display 1120 represents a target display that has a different maximum luminance level compared to the M value, namely the maximum luminance level of the mastering monitor 140.

Figure 12:
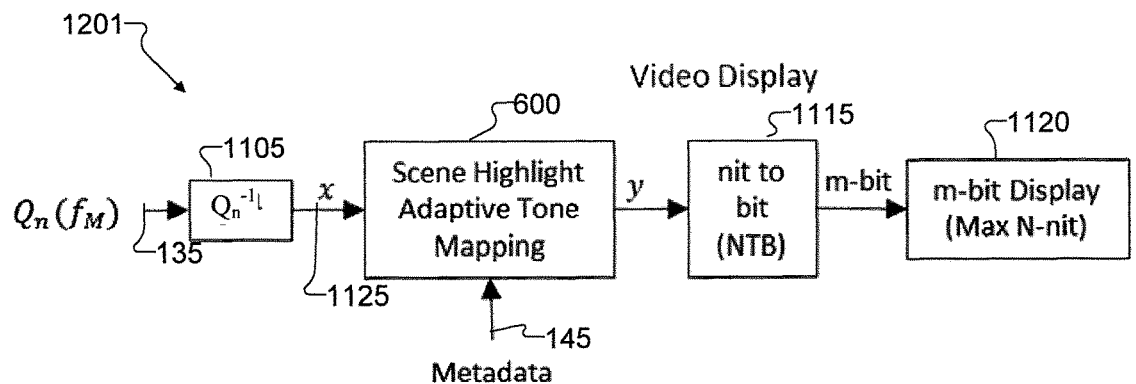
FIG. 12 illustrates an example tone mapping system for video display with metadata according to this disclosure.

Although FIG. 11A illustrates one example video display 1101, various changes may be made to FIG. 11A. For example, in other embodiments such as shown in FIG. 12, the video display 1201 can receive the metadata 145 from the mastering system 100 as input, and the scene highlight adaptive tone mapping block includes tone mapping block 600 which can configure its tone mapping functions based on the received metadata 145.

FIG. 11B illustrates a graph of an example relationship between the input x and output y of the tone mapping block 1110 of FIG. 11A. As an example, the tone mapping block 1110 can configure and apply the tone mapping function 1140 to the mastered video file 1125 ($x$). The tone mapping block 1110 maps the dynamic range (namely, 0 to $L_{max}$) of the input to the dynamic range (namely, 0 to X) of the display.

Figure 13:
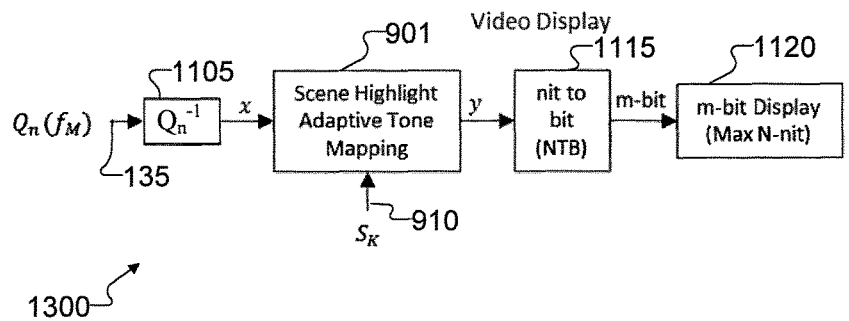
FIG. 13 illustrates an example tone mapping system for video display with a measure $S_K$ as an additional metadata according to this disclosure.

FIG. 13 illustrates an example tone mapping system for video display with a measure $S_K$ as an additional metadata according to this disclosure. The video display 1300 shown in FIG. 13 is for illustration only. Other embodiments could be used without departing from the scope of this disclosure.

In the system of FIG. 13, the video display 1300 receives input, namely, a quantized mastered video file 135 ($Q_n(f_M)$) and the measure $S_K$ 910, from the mastering system 900 of FIG. 9. The video display 1300 renders images by applying tonal-zone adaptive tone mapping. The video display 1300 includes a dequantizer module 1105 ($Q_n^{-1}$), a scene highlight adaptive tone mapping block 901 of FIG. 9B, a nit-to-bit (NTB) converter module 1115, and an m-bit display 1120.

Figure 14:
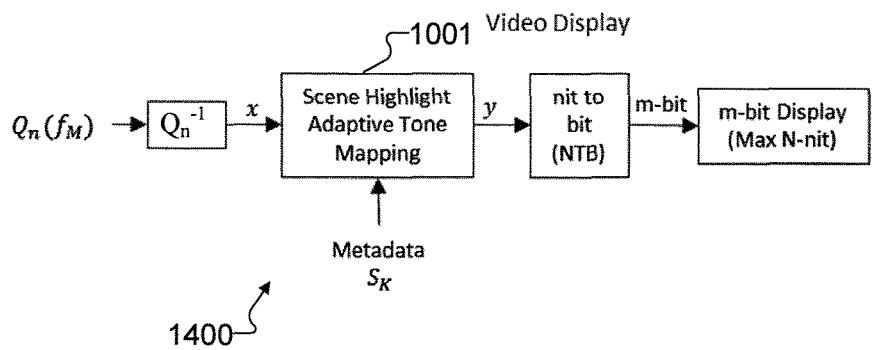
FIG. 14 illustrates an example tone mapping system for video display with metadata and a measure $S_K$ as an additional metadata according to this disclosure.

FIG. 14 illustrates an example tone mapping system for video display with metadata and a measure $S_K$ as an additional metadata according to this disclosure. The video display 1400 shown in FIG. 14 is for illustration only. Other embodiments could be used without departing from the scope of this disclosure.

In the system of FIG. 14, the video display 1400 receives input, namely, a quantized mastered video file 135 ($Q_n(f_M)$) and the measure $S_K$ 910 and metadata 145, from the mastering system 1000 of FIG. 10. The video display 1400 renders images by applying tonal-zone adaptive tone mapping. The video display 1400 includes a dequantizer module 1105 ($Q_n^{-1}$), a scene highlight adaptive tone mapping block 1001 of FIG. 10, a nit-to-bit (NTB) converter module 1115, and an m-bit display 1120.

Figure 15:
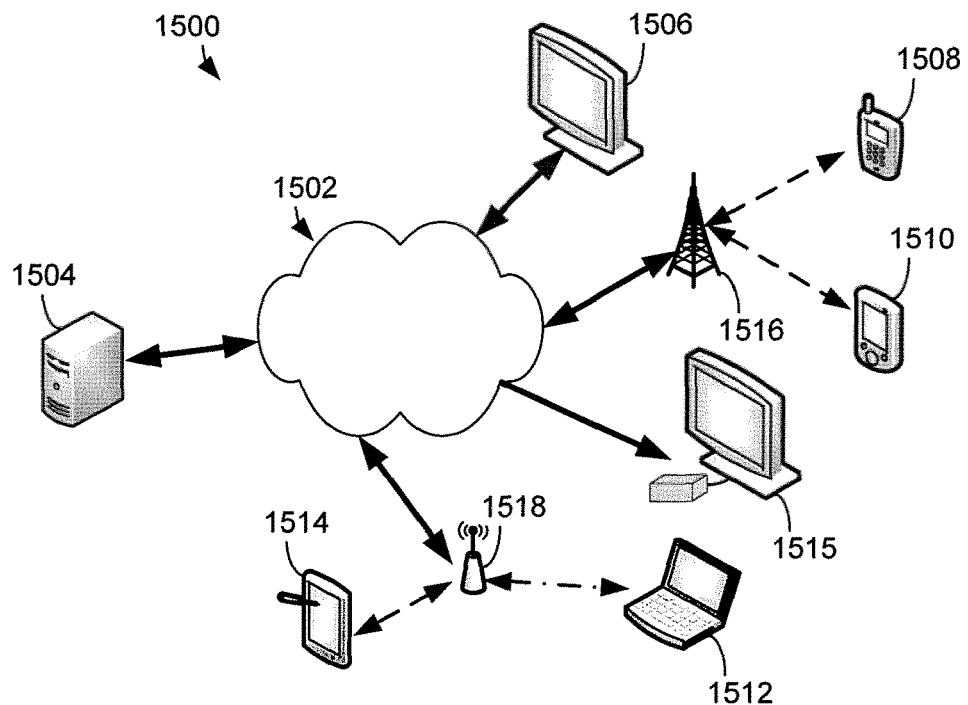
FIG. 15 illustrates an example computing system in which various embodiments of this disclosure may be implemented.

FIG. 15 illustrates an example computing system 1500 in which various embodiments of this disclosure may be implemented. The embodiment of the computing system 1500 shown in FIG. 15 is for illustration only. Other embodiments of the computing system 1500 could be used without departing from the scope of this disclosure.

As shown in FIG. 15, the system 1500 includes a network 1502, which facilitates communication between various components in the system 100 on one or more communication channels. The network 1502 may communicate Internet Protocol (IP) packets, frame relay frames, or other information between network addresses. The network 1502 may include one or more local area networks (LANs): metropolitan area networks (MANs); wide area networks (WANs); all or a portion of a global network, such as the Internet; or any other communication system or systems at one or more locations.

In various embodiments, network 1502 includes a broadcast and broadband networks and communication channels for communicating video data (e.g., video files including metadata and audio content) to client devices 1506-1515. The broadcasting elements of network 1502, such as cable and satellite communication links, provide broadcast of video data to client devices 106-115. The broadband elements of network 1502, Internet, wireless, wireline, and fiber optic network links and devices, provide for streaming and download of video data.

The network 1502 facilitates communications between one or more servers 1504 and various client devices 1506-1515. Each of the servers 1504 includes any suitable computing or processing device that can provide computing services for one or more client devices. Each of the servers 1504 could, for example, include one or more processing devices, one or more memories storing instructions and data, and one or more network interfaces facilitating communication over the network 1502. For example, one or more of the servers 104 may include processing circuitry for mastering a video or for tonal-zone adaptive tone mapping, as discussed in greater detail below.

Each client device 1506-1515 represents any suitable computing or processing device that interacts with at least one server or other computing device(s) over the network 1502. As will be discussed in greater detail below, the client devices 1506-1515 receive video (e.g., a mastered video file to be tone mapped or a tone mapped video file to be displayed) and may include processing circuitry for tonal-zone adaptive tone mapping. The client devices 1506-1515 each either includes or is connected to a display device for display of tone mapped video. In this example, the client devices 1506-1515 include a computer 1506, a mobile telephone or smartphone 1508, a personal digital assistant (PDA) 1510, a laptop computer 1512, tablet computer 1514; and a set-top box and/or television 1515. However, any other or additional client devices could be used in the communication system 1500. In this example, some client devices 1508-1514 communicate indirectly with the network 1502. For example, the client devices 1508-1510 communicate via one or more base stations 1516, such as cellular base stations or eNodeBs. Also, the client devices 1512-1515 communicate via one or more wireless access points 1518, such as IEEE 802.11 wireless access points. Note that these are for illustration only and that each client device could communicate directly with the network 102 or indirectly with the network 1502 via any suitable intermediate device(s) or network(s).

Although FIG. 15 illustrates one example of a communication system 1500, various changes may be made to FIG. 15. For example, the system 1500 could include any number of each component in any suitable arrangement. In general, computing and communication systems come in a wide variety of configurations, and FIG. 15 does not limit the scope of this disclosure to any particular configuration. While FIG. 15 illustrates one operational environment in which various features disclosed in this patent document can be used, these features could be used in any other suitable system.

Figure 16:
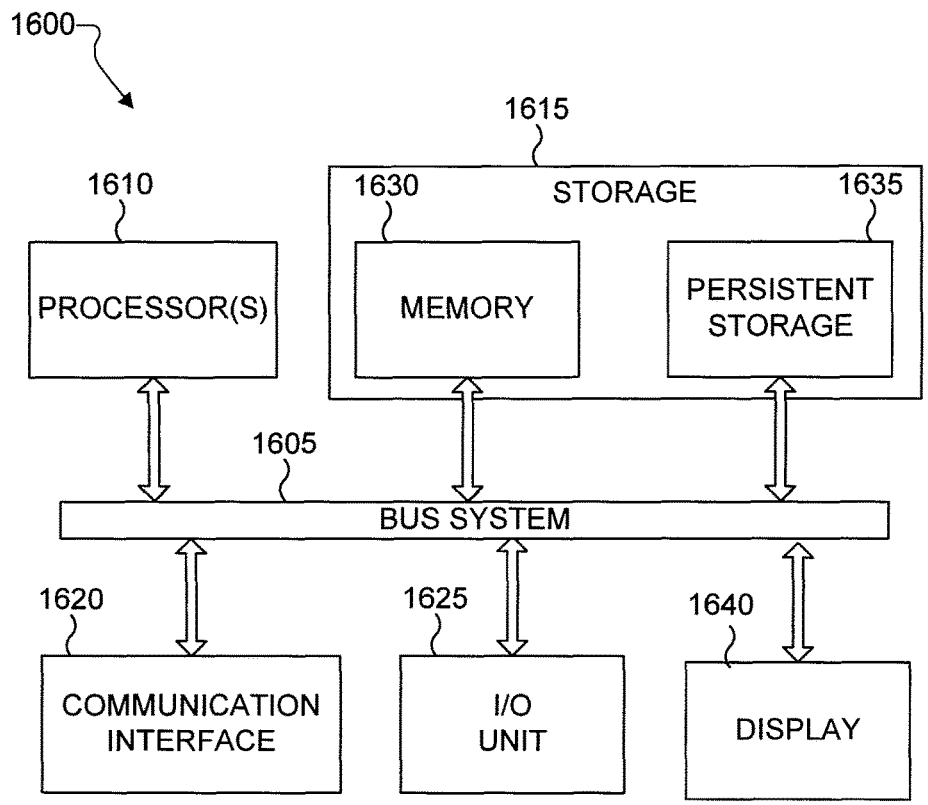
FIG. 16 illustrates an example video processing device according to this disclosure.

FIG. 16 illustrates an example video processing device 1600 according to this disclosure. In particular, the video processing device 1600 illustrates example components that may be included in any one of the server 1504 or the client devices 1506-115 in FIG. 15 to implement one or more embodiments of the present disclosure.

As shown in FIG. 16, the video processing device 1600 includes a bus system 1605, which supports communication between at least one processor 1610, at least one storage device 1615, at least one communication interface 1620, at least one input/output (I/O) unit 1625, and a display 1640.

The processor 1610 executes instructions that may be loaded into a memory 1630. The processor 1610 may include any suitable number(s) and type(s) of processors or other devices in any suitable arrangement. Example types of processor 1610 include microprocessors, microcontrollers, digital signal processors, field programmable gate arrays, application specific integrated circuits, and discreet circuitry. For example, the processor 1610 may implement tone mapping operations performed by any of the systems 300-800 being implemented in hardware or by executing stored instructions that causes the processor 1610 to perform the disclosed methods.

The memory 1630 and a persistent storage 1635 are examples of storage devices 1615, which represent any structure(s) capable of storing and facilitating retrieval of information (such as video data, program code, and/or other suitable information on a temporary or permanent basis). The memory 1630 may represent a random access memory or any other suitable volatile or non-volatile storage device(s). For example, the memory 1630 may contain instructions for implementing tone mapping techniques and/or may store streamed or buffered video data received from a server 1504. The persistent storage 1635 may contain one or more components or devices supporting longer-term storage of data, such as a read-only memory, hard drive, Flash memory, or optical disc. For example, the persistent storage 1635 may contain video data such as a mastered video file and metadata associated with the mastered video file.

The communication interface 1620 supports communications with other systems or devices. For example, the communication interface 1620 could include a network interface card, a cable modem, a broadcast receiver, or a wireless transceiver facilitating communications over the network 1502. The communication interface 1620 may support communications through any suitable physical or wireless communication link(s).

The I/O unit 1625 allows for input and output of data. For example, the I/O unit 1625 may provide a connection for user input through a keyboard, mouse, keypad, touchscreen, or other suitable input device. The I/O unit 1625 may also send output to the display 1640, printer, or other suitable output device.

The video processing device 1600 further includes or is connected to a display 1640, such as, for example, the target displays 705 and 805. In one example embodiment, the video processing device 1600 may be video processing circuitry included in a set top box, cable box, computer, etc. connected to the display 1640 for tone mapped video to be displayed. In another example embodiment, the video processing device 1600 may be the set top box, cable box, computer, media player, etc. connected to the display 1640 for tone mapped video to be displayed. In yet another example embodiment, the video processing device 1600 may be a server connected to the target display 1640 over a network connection. In another example embodiment, the video processing device 1600 may include the display 1640 that the tone mapped video to be displayed on as well as the video processing circuitry for performing the tone mapping. For example, the video processing device 1600 may be a television, monitor, mobile phone, laptop computer, tablet computer, etc.

Figure 17:
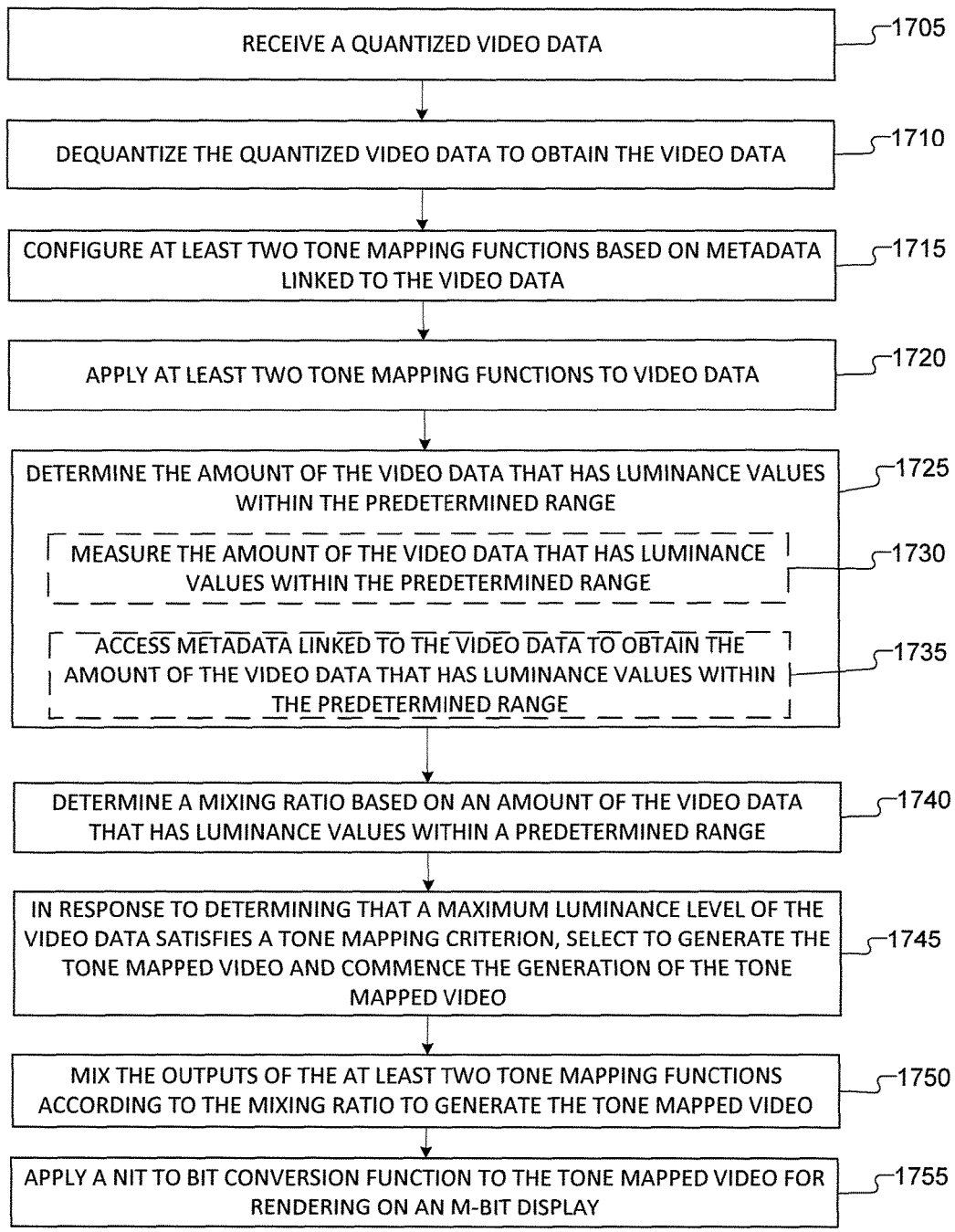
FIG. 17 illustrates method for tone mapping according to this disclosure.

FIG. 17 illustrates method for tone mapping according to this disclosure. The method for tone mapping can be implemented by a tone mapping block, such as one or more of the tone mapping blocks 205, 300, 600, 901, 1001, 1101, each of which includes at least one processor (referred to as "the processor" in regarding FIG. 17).

In block 1705, the processor receives a quantized video data. For example, the processor can be a component of the video display 1101 of FIG. 11A, which receives a quantized mastered video file 135 ($Q_n(f_M)$) as input.

In block 1710, the processor dequantizes the quantized video data to obtain the video data. For example, the processor can include the dequantizer module 1105 ($Q_n^{-1}$) of FIG. 11A.

In block 1715, the processor configures at least two tone mapping functions based on metadata linked to received video data. For example, as shown in FIG. 6, each of the tone mapping function blocks 605 and 610 configures its tone mapping function based on the SMF metadata 660 linked to mastered video $f_M$ of the input 330.

In block 1720, the processor applies at least two tone mapping functions to video data. The at least two tone mapping functions include a first tone mapping function and a second tone mapping function. For example, the processor can include the tone mapping function blocks 305 and 310, each of which receives mastered video $f_M$ as input 330 ($x$), applies a tone mapping function to the mastered video $f_M$ of the input 330 to generate a candidate tone mapped video as output 335 and 340.

In block 1725, the processor the amount of the video data that has luminance values within a predetermined range. In certain embodiments, in order to make this determination, the processor measures the amount of the video data that has luminance values within a predetermined range, as shown in block 1730. For example, the processor can include the tonal-zone area detector 315 of FIG. 3. In certain embodiments, in order to make this determination, the processor accesses metadata linked to the video data to obtain the measure of the amount of the video data that has luminance values within the predetermined range, as shown in block 1735. For example, the measure $S_K$ 910 can be linked to the mastered video file ($f_M$) in the form of metadata and output from the mastering system 900, in which case, the processor of the tone mapping block can access the measure $S_K$ 910 or otherwise receive the measure $S_K$ as input.

In block 1740, the processor determines a mixing ratio based on an amount of the video data that has luminance values within a predetermined range. For example, the processor can include the mixing ratio block 320 of FIG. 3. The mixing ratio represents a proportion of each of output of the at least two tone mapping functions.

In block 1745, in response to determining that a maximum luminance level of the video data satisfies a tone mapping criterion, the processor selects to generate a tone mapped video and commences the generation of the tone mapped video. For example, embodiments of the present disclosure are not limited to always generating a tone mapped video upon ever receipt of a mastered video file, such as the mastered video file 210, but can select to generate a tone mapped video based on a tone mapping criterion. An example of satisfying a tone mapping criterion is when input video x has a maximum luminance value of $L_{max}$ that exceeds the maximum luminance value of N a target display.

In block 1750, the processor generates a tone mapped video by mixing the outputs of the at least two tone mapping functions according to the mixing ratio.

In block 1755, the processor applies a nit to bit conversion function to the tone mapped video for rendering on an m-bit display. For example, the processor can include the nit-to-bit (NTB) converter module 1115 of FIG. 11A. The processor can provide the tone mapped video in m-bit format 1135 to an m-bit display 1120, which displays the tone mapped video.

Although FIG. 17 illustrates one example method 1700 for tone mapping, various changes may be made to FIG. 17. For example, while shown as a series of steps, various steps in FIG. 17 could overlap, occur in parallel, occur in a different order, or occur any number of times.

Although the present disclosure has been described with example embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for tone mapping, the method comprising:
   applying, by at least one processor, at least two tone mapping functions to video data, the at least two tone mapping functions including a first tone mapping function and a second tone mapping function, each of the first and second tone mapping functions adjusts its tone mapping function based on metadata linked to the video data, wherein the metadata comprises a maximum frame average luminance level and a maximum contents luminance level;
   measuring a tonal-zone of a group of consecutive frames of the video data having luminance values within a predetermined range;
   determining a mixing ratio based on the measure of the tonal-zone of the group of consecutive frames of the video data having luminance values within the predetermined range, the mixing ratio representing a proportion of each output of the at least two tone mapping functions; and
   mixing the outputs of the at least two tone mapping functions according to the mixing ratio to generate a tone mapped video.

2. The method of claim 1, further comprising:
   in response to determining that a maximum luminance level of the video data satisfies a tone mapping criterion, selecting to generate the tone mapped video and commencing the generation of the tone mapped video.

3. The method of claim 1, wherein determining of the mixing ratio further comprises:
   accessing the metadata linked to the video data and obtaining an amount of the video data in the group of consecutive frames that has luminance values within the predetermined range.

4. The method of claim 1, wherein the at least two tone mapping functions include:
   a high tone mapping function; and
   a low tone mapping function that provides an output having more illumination range to low luminance values of the video data than an output that the high tone mapping function provides.

5. The method of claim 1, wherein the group of consecutive frames are of a same scene within the video data.

6. The method of claim 1, further comprising:
   receiving a quantized video data;
   dequantizing the quantized video data to obtain the video data; and
   applying a nit to bit conversion function to the tone mapped video for rendering on an m-bit display.

7. The method of claim 1, wherein the predetermined range includes:
   a range greater than a pre-determined constant (K) and less than a maximum luminance value (M) of a mastered video.

8. An apparatus for tone mapping, the apparatus comprising:
   a memory; and
   at least one processor coupled to the memory, the at least one processor configured to:
   apply at least two tone mapping functions to video data, the at least two tone mapping functions including a first tone mapping function and a second tone mapping function, each of the first and second tone mapping functions adjusts its tone mapping function based on metadata linked to the video data, wherein the metadata comprises a maximum frame average luminance level and a maximum contents luminance level;

measure a tonal-zone of a group of consecutive frames of the video data having luminance values within a predetermined range;

determine a mixing ratio based on the measure of the tonal-zone of the group of consecutive frames of the video data having luminance values within the predetermined range, the mixing ratio representing a proportion of each output of the at least two tone mapping functions; and mix the outputs of the at least two tone mapping functions according to the mixing ratio to generate a tone mapped video.

9. The apparatus of claim 8, wherein the at least one processor is further configured to:
in response to determining that a maximum luminance level of the video data satisfies a tone mapping criterion, select to generate the tone mapped video and commencing the generation of the tone mapped video.

10. The apparatus of claim 8, wherein the at least one processor is further configured to determine the mixing ratio by:
accessing the metadata linked to the video data to obtain an amount of the video data in the group of consecutive frames that has luminance values within the predetermined range.

11. The apparatus of claim 8, wherein the at least two tone mapping functions include:
a high tone mapping function; and
a low tone mapping function that provides an output having more illumination range to low luminance values of the video data than an output that the high tone mapping function provides.

12. The apparatus of claim 8, wherein the group of consecutive frames are of a same scene within the video data.

13. The apparatus of claim 8, wherein the at least one processor is further configured to:
receive a quantized video data;
dequantize the quantized video data to obtain the video data; and
apply a nit to bit conversion function to the tone mapped video for rendering on an m-bit display.

14. The apparatus of claim 8, wherein the predetermined range includes:
a range greater than a pre-determined constant (K) and less than a maximum luminance value (M) of a mastered video.

15. A non-transitory computer readable medium embodying a computer program, the computer program comprising computer readable program code that when executed causes at least one processor to:
apply at least two tone mapping functions to video data, the at least two tone mapping functions including a first tone mapping function and a second tone mapping function, each of the first and second tone mapping functions adjusts its tone mapping function based on metadata linked to the video data, wherein the metadata comprises a maximum frame average luminance level and a maximum contents luminance level;

measure a tonal-zone in a group of consecutive frames of the video data having luminance values within a predetermined range;

determine a mixing ratio based on the measured tonal-zone of the group of consecutive frames of the video data, the mixing ratio representing a proportion of each output of the at least two tone mapping functions; and mix the outputs of the at least two tone mapping functions according to the mixing ratio to generate a tone mapped video.

* * * * *